United States Patent
Xu et al.

(10) Patent No.: US 11,575,266 B2
(45) Date of Patent: Feb. 7, 2023

(54) PARAMETRIC CURVE SCANNING METHOD FOR PHOTOVOLTAIC STRING, CONVERTER, AND PHOTOVOLTAIC POWER GENERATION SYSTEM

(71) Applicant: Huawei Digital Power Technologies Co., Ltd., Shenzhen (CN)

(72) Inventors: Zhiwu Xu, Shanghai (CN); Hualei Ju, Shanghai (CN); Guilei Gu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/689,863

(22) Filed: Mar. 8, 2022

(65) Prior Publication Data
US 2022/0190605 A1   Jun. 16, 2022

Related U.S. Application Data (63) Continuation of application No. PCT/CN2020/082317, filed on Mar. 31, 2020.

(51) Int. Cl.
*H02J 3/38* (2006.01)

(52) U.S. Cl.
CPC ........... *H02J 3/381* (2013.01); *H02J 2300/24* (2020.01)

(58) Field of Classification Search
CPC .... H02J 3/381; H02J 2300/24; H02J 2300/26; Y02E 10/50; Y02E 10/56; H02S 50/10
See application file for complete search history.

(56) References Cited

U.S. PATENT DOCUMENTS

| | | | |
|---|---|---|---|
| 2013/0194564 A1 | 8/2013 | Stapelmann et al. | |
| 2018/0234051 A1* | 8/2018 | Nl | H02J 3/38 |
| 2019/0285672 A1 | 9/2019 | Hoff | |

FOREIGN PATENT DOCUMENTS

| | | |
|---|---|---|
| CN | 105680797 A | 6/2016 |
| CN | 106357220 A | 1/2017 |
| CN | 106712716 A | 5/2017 |
| CN | 107017836 A | 8/2017 |
| CN | 107508551 A | 12/2017 |
| CN | 110677118 A | 1/2020 |

* cited by examiner

*Primary Examiner* — Toan T Vu
(74) *Attorney, Agent, or Firm* — Womble Bond Dickinson (US) LLP (57) ABSTRACT

This application relates to a converter in a photovoltaic power generation system and a parametric curve scanning method for a photovoltaic string. A parametric curve includes a current-voltage curve or a power-voltage curve. The scanning method includes: controlling an output voltage of the photovoltaic string to change from a first endpoint voltage of a first voltage range to a second endpoint voltage of the first voltage range according to a first preset rule, to scan a first parametric curve; controlling the output voltage of the photovoltaic string to change from a third endpoint voltage of a second voltage range to a fourth endpoint voltage of the second voltage range according to a second preset rule, to scan a second parametric curve. There is an intersection set between the first voltage range and the second voltage range. In this application, whether a scanned curve is affected by a light change may be determined based on the first parametric curve and the second parametric curve. This is convenient and fast, and no additional hardware test device is required.

20 Claims, 7 Drawing Sheets

Control an output voltage of a photovoltaic string to change from a first endpoint voltage of a first voltage range to a second endpoint voltage of the first voltage range according to a first preset rule, and sample an output current of the photovoltaic string in the process in which the output voltage of the photovoltaic string changes, to obtain a first IV curve — S11

Control the output voltage of the photovoltaic string to change from a third endpoint voltage of a second voltage range to a fourth endpoint voltage of the second voltage range according to a second preset rule, and sample an output current of the photovoltaic string in the process in which the output voltage of the photovoltaic string changes, to obtain a second IV curve, where there is an intersection set between the first voltage range and the second voltage range — S12

PARAMETRIC CURVE SCANNING METHOD FOR PHOTOVOLTAIC STRING, CONVERTER, AND PHOTOVOLTAIC POWER GENERATION SYSTEM

CROSS-REFERENCE TO RELATED APPLICATIONS

This application is a continuation of International Application No. PCT/CN2020/082317, filed on Mar. 31, 2020, the disclosure of which is hereby incorporated by reference in its entirety.

TECHNICAL FIELD

This application relates to the field of photovoltaic power generation technologies, and in particular, to a parametric curve scanning method for a photovoltaic string, a converter, and a photovoltaic power generation system.

BACKGROUND

A photovoltaic power generation system is a power generation system in which solar energy is directly converted into electrical energy by using a photovoltaic module (e.g., Solar Cell Module), and includes a photovoltaic string, a battery, a controller, and a photovoltaic inverter. The photovoltaic string includes a plurality of photovoltaic modules that are combined in series or/and in parallel. The photovoltaic module is a smallest indivisible photovoltaic cell assembly that can independently provide a direct current output.

Currently, to detect the photovoltaic string to determine whether the photovoltaic string is defective or damaged, a photovoltaic system may perform IV curve scanning on the photovoltaic string on line. In addition, IV curve scanning can also help the photovoltaic system to learn of information such as a current power generation capability and working condition of the photovoltaic string. However, a light change exerts relatively large impact on an IV output feature of the photovoltaic string. If there is a light change in a process in which the photovoltaic system performs IV curve scanning on the photovoltaic string, an IV curve that is of the photovoltaic string and that is obtained through detection cannot accurately reflect the IV output feature of the photovoltaic string.

SUMMARY

Embodiments of this application disclose a parametric curve scanning method for a photovoltaic string, a converter, and a photovoltaic power generation system, so that whether the currently obtained parametric curve is affected by a light change can be determined based on the obtained parametric curve, to determine whether the currently obtained parametric curve is valid, thereby improving parametric curve scanning reliability.

An embodiment (sometimes referred to as, "a first aspect") of this application discloses a parametric curve scanning method for a photovoltaic string, including: controlling (e.g., manipulating, adjusting) an output voltage of the photovoltaic string to change from a first endpoint voltage of a first voltage range to a second endpoint voltage of the first voltage range according to a first preset rule, and/or obtaining (e.g., measuring) a current parameter or a power parameter of the photovoltaic string in the process in which the output voltage of the photovoltaic string changes, to scan a first parametric curve. In some embodiments, the parametric curve scanning method includes controlling the output voltage of the photovoltaic string to change from a third endpoint voltage of a second voltage range to a fourth endpoint voltage of the second voltage range according to a second preset rule, and/or obtaining a current parameter or a power parameter of the photovoltaic string in the process in which the output voltage of the photovoltaic string changes, to scan a second parametric curve, where there is an intersection set between the first voltage range and the second voltage range.

The first voltage range is a voltage scanning range including a maximum output voltage and a minimum output voltage of the photovoltaic string in a process of scanning the first parametric curve. The second voltage range is a voltage scanning range including a maximum output voltage and a minimum output voltage of the photovoltaic string in a process of scanning the second parametric curve. For example, the maximum output voltage of the photovoltaic string may be an open-circuit voltage, and a minimum output voltage value may be 0 V.

In some embodiments, parametric curve scanning is separately performed on the photovoltaic string in the first voltage range and the second voltage range, and there is an intersection set between the first voltage range and the second voltage range, so that the first parametric curve and the second parametric curve that are obtained include parts corresponding to a same voltage. However, currents corresponding to the same voltage are obtained at different time points, so that it can be determined, by comparing the currents corresponding to the same voltage part, whether the currently obtained parametric curve is affected by a light change, to further determine whether the currently obtained parametric curve is valid, thereby improving reliability of parametric curve scanning reliability. In addition, in this method, no test device needs to be additionally added, to effectively reduce a quantity of hardware devices that need to be provided, and reduce costs.

In some embodiments, the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage. In this case, a scanning endpoint of the first parametric curve is relatively close to a scanning startpoint of the second parametric curve. Therefore, a parametric curve scanning speed can be increased.

In some embodiments, to improve comparison precision, the first endpoint voltage is equal to the fourth endpoint voltage, and/or the second endpoint voltage is equal to the third endpoint voltage.

In some embodiments, to further improve comparison efficiency, data at two sampling points is completely the same, and a time-related waveform in the first voltage range is symmetrical to a time-related waveform in the second voltage range.

In some embodiments, to improve comparison efficiency, the first preset rule is a rule in which a voltage drops by a fixed voltage difference and the second preset rule is a rule in which a voltage rises by a fixed voltage difference; or the first preset rule is a rule in which a voltage rises by a fixed voltage difference and the second preset rule is a rule in which a voltage drops by a fixed voltage difference.

In some embodiments, the scanning method further includes: determining, based on the first parametric curve and the second parametric curve, whether the currently scanned parametric curve is affected by a light change.

In some embodiments, the determining, based on the first parametric curve and the second parametric curve, whether the currently scanned parametric curve is affected by a light change includes: comparing the first parametric curve and the second parametric curve, to determine whether light intensity corresponding to the first parametric curve and light intensity corresponding to the second parametric curve change.

In some embodiments, if an absolute value of a difference between the corresponding parameter values of a same voltage point that are on the first parametric curve and the second parametric curve is less than a preset threshold, determining that the currently scanned parametric curve is not affected by the light change.

In some embodiments, to further improve precision of the obtained curve, the scanning method further includes: processing the first parametric curve and the second parametric curve when it is determined that the currently scanned curve is not affected by the light change, to obtain a final parametric curve.

In some embodiments, an abnormal signal is sent when it is determined that the currently scanned curve is affected by the light change, to report, to a host computer, that current scanning fails. Therefore, the host computer may determine, based on feedback, whether to send a parametric curve scanning instruction again.

An embodiment (sometimes referred to as, "a second aspect") of this application discloses a converter, including an adjustment unit and an obtaining unit. The adjustment unit is configured to control an output voltage of the photovoltaic string to change from a first endpoint voltage of a first voltage range to a second endpoint voltage of the first voltage range according to a first preset rule. The obtaining unit is configured to obtain a current parameter and/or a power parameter of the photovoltaic string in the process in which the output voltage of the photovoltaic string changes, to scan a first parametric curve. The adjustment unit is further configured to control the output voltage of the photovoltaic string to change from a third endpoint voltage of a second voltage range to a fourth endpoint voltage of the second voltage range according to a second preset rule. The obtaining unit is further configured to obtain a current parameter and/or a power parameter of the photovoltaic string in the process in which the output voltage of the photovoltaic string changes, to scan a second parametric curve. There is an intersection set between the first voltage range and the second voltage range.

It can be understood that a voltage parameter is also obtained when the current parameter and/or the power parameter of the photovoltaic string is obtained in the process in which the output voltage of the photovoltaic string changes, to form a current-voltage (IV) curve or a power-voltage (PV) curve.

The first voltage range is a first voltage scanning range including a maximum output voltage and a minimum output voltage of the photovoltaic string in a process of scanning the first parametric curve. The second voltage range is a second voltage scanning range including a maximum output voltage and a minimum output voltage of the photovoltaic string in a process of scanning the second parametric curve. For example, the maximum output voltage of the photovoltaic string may be an open-circuit voltage, and a minimum output voltage value may be 0 V.

In some embodiments, the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage.

In some embodiments, the first endpoint voltage is equal to the fourth endpoint voltage, and/or the second endpoint voltage is equal to the third endpoint voltage.

In some embodiments, a time-related waveform in the first voltage range is symmetrical to a time-related waveform in the second voltage range.

In some embodiments, the first preset rule is a rule in which a voltage drops by a fixed voltage difference and the second preset rule is a rule in which a voltage rises by a fixed voltage difference; or the first preset rule is a rule in which a voltage rises by a fixed voltage difference and the second preset rule is a rule in which a voltage drops by a fixed voltage difference.

In some embodiments, the converter further includes a determining unit. The determining unit is configured to determine, based on the first parametric curve and the second parametric curve, whether the currently scanned parametric curve is affected by a light change.

In some embodiments, the determining unit is configured to compare the first parametric curve and the second parametric curve, to determine whether light intensity corresponding to the first parametric curve and light intensity corresponding to the second parametric curve change.

In some embodiments, the determining unit is configured to: when an absolute value of a difference between the corresponding parameter values of a same voltage point that are on the first parametric curve and the second parametric curve is less than a preset threshold, determine that the currently scanned parametric curve is not affected by the light change.

In some embodiments, the converter further includes a processing unit. The processing unit is configured to process the first parametric curve and the second parametric curve when it is determined that the currently scanned curve is not affected by the light change, to obtain a final parametric curve.

In some embodiments, the processing unit is further configured to send an abnormal signal when it is determined that the currently scanned curve is affected by the light change.

An embodiment (sometimes referred to as, "a third aspect") of this application discloses a converter, including a DC/DC circuit and a sampling circuit. The sampling circuit and the DC/DC circuit are electrically connected. The DC/DC circuit is configured to control an output voltage of the photovoltaic string to change from a first endpoint voltage of a first voltage range to a second endpoint voltage of the first voltage range according to a first preset rule. The sampling circuit is configured to obtain a current parameter and/or a power parameter of the photovoltaic string in the process in which the output voltage of the photovoltaic string changes, to scan a first parametric curve. The DC/DC circuit is further configured to control the output voltage of the photovoltaic string to change from a third endpoint voltage of a second voltage range to a fourth endpoint voltage of the second voltage range according to a second preset rule. The sampling circuit is further configured to obtain a current parameter and/or a power parameter of the photovoltaic string in the process in which the output voltage of the photovoltaic string changes, to scan a second parametric curve. There is an intersection set between the first voltage range and the second voltage range.

The first voltage range is a first voltage scanning range including a maximum output voltage and a minimum output voltage of the photovoltaic string in a process of scanning the first parametric curve. The second voltage range is a second voltage scanning range including a maximum output voltage and a minimum output voltage of the photovoltaic string in a process of scanning the second parametric curve. For example, the maximum output voltage of the photovoltaic string may be an open-circuit voltage, and a minimum output voltage value may be 0 V.

In some embodiments, the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage.

In some embodiments, the first endpoint voltage is equal to the fourth endpoint voltage, and/or the second endpoint voltage is equal to the third endpoint voltage.

In some embodiments, a time-related waveform in the first voltage range is symmetrical to a time-related waveform in the second voltage range.

In some embodiments, the first preset rule is a rule in which a voltage drops by a fixed voltage difference and the second preset rule is a rule in which a voltage rises by a fixed voltage difference; or the first preset rule is a rule in which a voltage rises by a fixed voltage difference and the second preset rule is a rule in which a voltage drops by a fixed voltage difference.

In some embodiments, the converter further includes a controller, and the controller is separately electrically connected to the DC/DC circuit and the sampling circuit. The controller is configured to determine, based on the first parametric curve and the second parametric curve, whether the currently scanned parametric curve is affected by a light change.

In some embodiments, the controller is configured to compare the first parametric curve and the second parametric curve, to determine whether light intensity corresponding to the first parametric curve and light intensity corresponding to the second parametric curve change.

In some embodiments, the controller is configured to: when an absolute value of a difference between the corresponding parameter values of a same voltage point that are on the first parametric curve and the second parametric curve is less than a preset threshold, determine that the currently scanned parametric curve is not affected by the light change.

In some embodiments, the controller is further configured to process the first parametric curve and the second parametric curve when it is determined that the currently scanned curve is not affected by the light change, to obtain a final parametric curve.

In some embodiments, the controller is further configured to send an abnormal signal when it is determined that the currently scanned curve is affected by the light change.

An embodiment (sometimes referred to as, "a fourth aspect") of this application discloses a photovoltaic power generation system, including a power grid and at least one photovoltaic string. The photovoltaic power generation system further includes the converter according to any one of the second aspect and the possible implementations of the second aspect; or the photovoltaic power generation system further includes the converter according to any one of the third aspect and the possible implementations of the third aspect. An input end of the converter is connected to the at least one photovoltaic string, and an output end of the converter is connected to the power grid.

An embodiment (sometimes referred to as, "a fifth aspect") of this application discloses a computer-readable storage medium. The computer-readable storage medium stores a computer program, the computer program includes at least one segment of code, and the at least one segment of code may be executed by a computer, to control the computer to perform the method according to any one of the first aspect and the possible implementations of the first aspect.

DESCRIPTION OF EMBODIMENTS

This application provides a photovoltaic power generation system, a converter applied to the photovoltaic power generation system, and a parametric curve scanning method for a photovoltaic string. The parametric curve includes a current-voltage (IV) curve or a power-voltage (PV) curve. The converter may perform parametric curve scanning on at least one photovoltaic string connected to the converter, to detect whether the photovoltaic string is defective or damaged, and learn of a power generation capability of the current photovoltaic power generation system by using a scanned parametric curve. The following describes embodiments of this application with reference to accompanying drawings.

Figure 1:
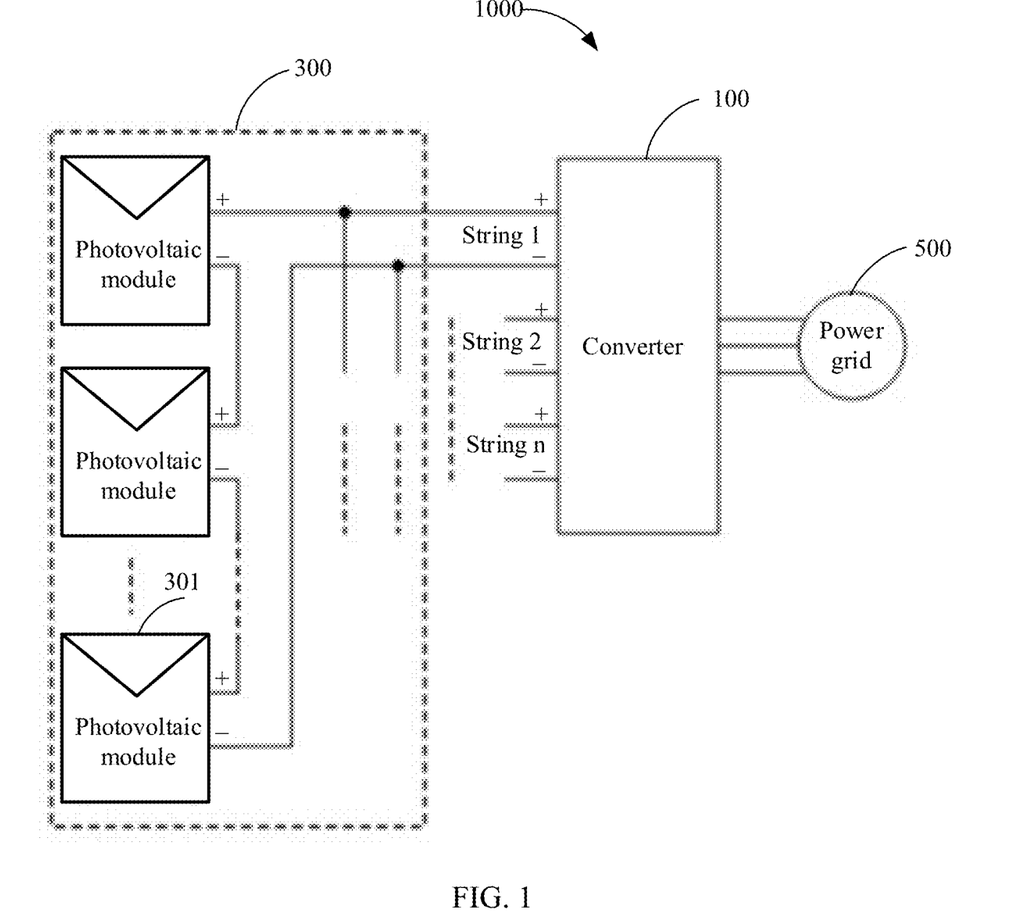
FIG. 1 is a schematic structural diagram of a photovoltaic power generation system according to an embodiment of this application.

FIG. 1 is a schematic structural diagram of a photovoltaic power generation system 1000 according to an embodiment of this application. As shown in FIG. 1, the photovoltaic power generation system 1000 includes a converter 100, at least one photovoltaic string 300, and a power grid 500. The photovoltaic string 300 includes a plurality of photovoltaic modules 301 that are combined in series or/and in parallel. The photovoltaic module 301, also referred to as a solar panel, is a core part of the photovoltaic power generation system, converts solar energy into electrical energy to provide a direct current output, and transmits the electrical energy to a battery for storage or to drive a load to work. Because an individual solar cell cannot be directly used as a power supply, several individual cells need to be connected in series or/and in parallel and tightly packaged into a module, and the module is a smallest indivisible photovoltaic cell assembly. "A and/or B" in this application means A and B, and A or B.

Certainly, in some embodiments, the photovoltaic string 300 may include only one photovoltaic module 301.

The converter 100 is connected to at least one photovoltaic string 300, to convert output power of the photovoltaic module 301 connected to the converter 100. In some embodiments, the converter 100 is a photovoltaic inverter, and may be further configured to: convert, into an alternating current, a direct current output by the at least one photovoltaic string 300, and then output the alternating current to the power grid 500. In another embodiment, the converter 100 may be an optimizer. The converter 100 is not limited herein, provided that the converter 100 can convert the output power of the photovoltaic module 301 connected to the converter 100.

The power grid 500, also referred to as an electrical grid, includes a substation for various voltages and a power transmission and distribution line in a power system (that is, includes a voltage transformation unit, a power transmission unit, and a power distribution unit), and is configured to: transmit and distribute electrical energy, and change a voltage.

It can be understood that the photovoltaic power generation system 1000 may include a plurality of converters 100, and an alternating current side of the converter 100 may be connected to a step-up transformer (not shown in the figure) and then connected to the power grid 500. In some embodiments, a quantity of converters 100 included in the photovoltaic power generation system 1000 and whether the alternating current side of the converter 100 is connected to the step-up transformer may be determined based on a specific application environment. This is not specifically limited herein.

It should be noted that in an embodiment, when the photovoltaic power generation system 1000 includes a plurality of converters 100, the plurality of converters 100 may communicate with each other through a communications bus. The communications bus may be an industry standard architecture (ISA) bus, a peripheral component interconnect (PCI) bus, an extended industry standard architecture (EISA) bus, or the like. The bus may be classified into an address bus, a data bus, a control bus, and the like, for example, a bus 485.

In some embodiments, the photovoltaic power generation system 1000 may further include a host computer (not shown in the figure), configured to communicate with the converter 100. The host computer may be an independent communications host, or may be a mobile terminal device. The host computer may communicate with the converter 100 through wireless communication (for example, Wi-Fi, Lora, or Zigbee) or PLC communication.

Figure 2:
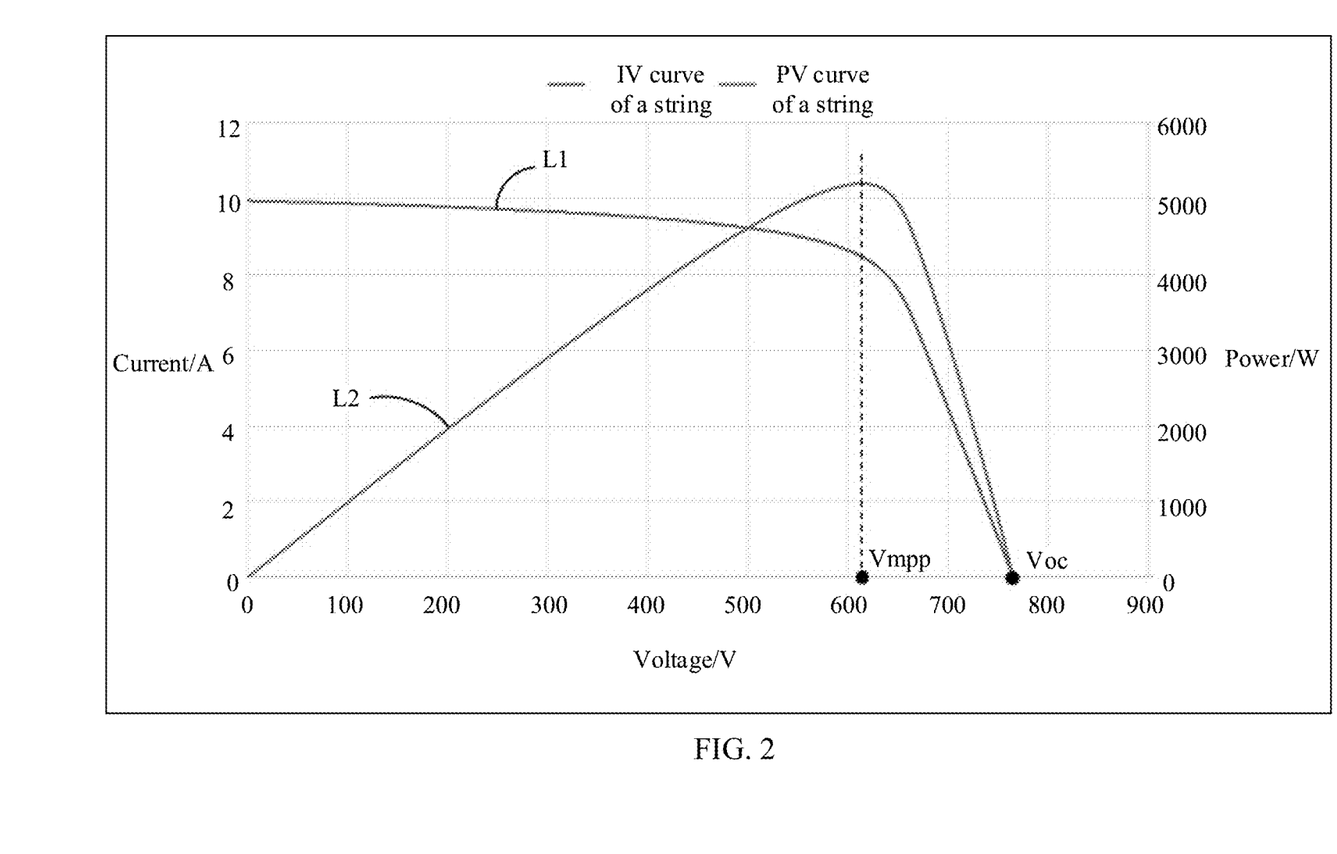
FIG. 2 is a diagram of an IV curve and a PV curve of a photovoltaic string according to an embodiment of this application.

FIG. 2 is a diagram of a typical IV curve and PV curve of a photovoltaic string according to an embodiment of this application. As shown in FIG. 2, a curve L1 is the IV curve of the string, and a curve L2 is the PV curve of the string. Voc is an open-circuit voltage of the photovoltaic string, and is defined as a string voltage corresponding to an output without load of the string. Vmpp is a maximum power point voltage of the string, and is defined as a string voltage corresponding to maximum output power of the string.

It can be seen from FIG. 2 that the photovoltaic string 300 has a feature in which the voltage decreases with an increase in a current. Therefore, there is an optimal working point at which the maximum power can be obtained. In addition, an output of the photovoltaic string 300 changes with solar radiation intensity and a temperature of the photovoltaic string 300. Because the solar radiation intensity changes, the optimal working point is obviously changed. In some embodiments, relative to these changes, a working point of the photovoltaic string 300 is always at a maximum power point, and the photovoltaic power generation system 1000 always obtains a maximum power output from the photovoltaic string 300. Such control is maximum power tracking control. A most distinguishing feature of the converter 100 used in the photovoltaic power generation system 1000 is that the converter 100 includes a maximum power point tracking (MPPT) function.

Figure 3:
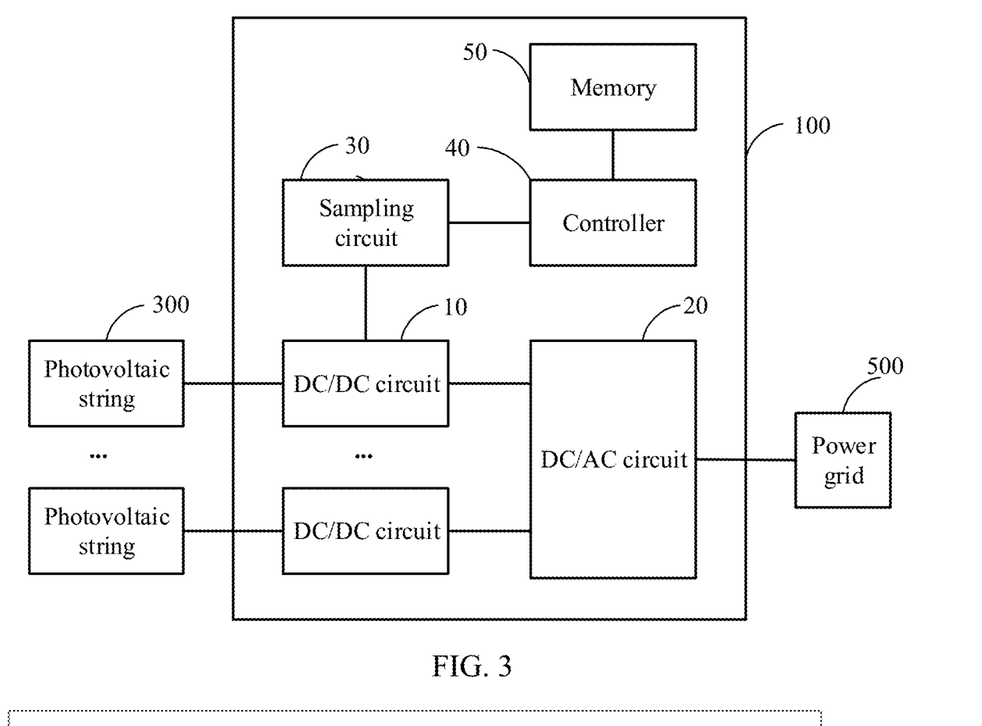
FIG. 3 is a principle block diagram of a converter according to an embodiment of this application.

FIG. 3 is a principle block diagram of a converter according to an embodiment of this application. In other words, the converter 100 in FIG. 1 may be implemented by using a structure in FIG. 3. As shown in FIG. 3, the converter 100 includes a DC/DC circuit 10, a DC/AC circuit 20, a sampling circuit 30, a controller 40, and a memory 50. Functions of the DC/DC circuit 10, the DC/AC circuit 20, the sampling circuit 30, the controller 40, and the memory 50 may be implemented by using an integrated circuit. The DC-DC DC/DC circuit 10, the DC-AC DC/AC circuit 20, the sampling circuit 30, the controller 40, and the memory 50 are integrated on a PCB (printed circuit board). The printed circuit board, also referred to as a printed wire board, is an important electronic part, is a support of an electronic component, and is a carrier electrically connected to the electronic component.

In some embodiments, the converter 100 includes at least one DC/DC circuit 10. Each DC/DC circuit 10 is correspondingly connected to one photovoltaic string 300 that is used as an input end of the converter 100. The DC/DC circuit 10 is configured to adjust an output voltage of the photovoltaic string 300. In another embodiment, the converter 100 may include only one DC/DC circuit 10, and the DC/DC circuit 10 is connected to at least one photovoltaic string 300. In other words, the DC/DC circuit 10 has a plurality of input ends. In addition, in some embodiments, the DC/DC circuit 10 may be omitted. In this case, the photovoltaic string 300 needs to be connected to an input end of the DC/AC circuit 20.

In some embodiments, the DC/DC circuit 10 may work in a power conversion mode, and is configured to: perform power conversion on direct-current electric energy of the photovoltaic string 300 at the input end, and then output the converted direct-current electric energy to an output end. In some embodiments, the DC/DC circuit 10 may work in a pass-through mode, and directly connect the input end and the output end. In some embodiments, the DC/DC circuit 10 may be set based on a specific application environment, for example, may be set to a buck circuit, a boost circuit, or a buck-boost circuit.

An input end of the DC/AC circuit 20 is electrically connected to the DC/DC circuit 10, and an output end of the DC/AC circuit 20 is electrically connected to the power grid 500, to convert direct-current electric energy into alternating-current electric energy, and input the alternating-current electric energy to the power grid 500. It can be understood that in another embodiment, the DC/AC circuit 20 may be omitted. In other words, the converter 100 can include only the DC/DC circuit.

The sampling circuit 30 is electrically connected to the DC/DC circuit 10, to detect an output voltage of each photovoltaic string 300 and a current corresponding to the output voltage. In some embodiments, the sampling circuit 30 may include a sensor, for example, a current sensor.

The controller 40 is separately electrically connected to the DC/DC circuit 10, the DC/AC circuit 20, the sampling circuit 30, and the memory 50. The controller 40 is a part that can coordinate work of all parts based on a function requirement of an instruction, is a nerve center and a command center of a system, usually includes three parts: an instruction register (IR), a program counter (PC), and an operation controller (OC), and plays an important role in coordinating ordered work of the entire system. The controller 40 herein may be one or more devices, circuits, and/or processing cores for processing data (for example, a computer program instruction).

In another embodiment, the controller 40 may be a processor or may be a collective term of a plurality of processing elements. For example, the processor 40 may be a general-purpose central processing unit (CPU), or may be an application-specific integrated circuit (ASIC), or one or more integrated circuits for controlling program execution of a solution of this application, for example, one or more microprocessors (DSP), or one or more field programmable gate arrays (FPGA). In some embodiments, in an embodiment, the processor 40 may include one or more CPUs.

The memory 50 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, the memory is not limited thereto. The memory 50 may exist independently. The memory 50 may alternatively be integrated with the controller 40. The memory 50 may be configured to store data such as a current, a voltage, and power of the photovoltaic string 300.

In some embodiments, the memory 50 is further configured to store application code for execution of the solution of this application, and the execution is controlled by the controller 40. In other words, the controller 40 is configured to execute the application code stored in the memory 50.

It can be understood that the structure illustrated in this embodiment of this application constitutes no specific limitation on the converter 100. In some other embodiments of this application, the converter 100 may include more or fewer parts than those shown in the figure, or combine some parts, or split some parts, or have different part arrangements. The parts shown in the figure may be implemented by using hardware, software, or a combination of software and hardware.

In some embodiments, the converter 100 may be further configured to perform IV curve scanning on the photovoltaic string 300 connected to the converter 100, to detect whether the photovoltaic string 300 connected to the converter 100 is defective or damaged. In addition, an IV curve can also be used to indicate information such as a current power generation capability and working condition of the photovoltaic string 300. However, a light change exerts relatively large impact on an IV output feature of the photovoltaic string. If there is a light change in a process in which the photovoltaic system performs IV curve scanning on the photovoltaic string, an IV curve that is of the photovoltaic string and that is obtained through detection cannot accurately reflect the IV output feature of the photovoltaic string.

To determine whether the currently scanned IV curve is valid and affected by the light change, an embodiment of this application further discloses a parametric curve scanning method for a photovoltaic string. This method is applied to the converter 100. The parametric curve includes one of a current-voltage IV curve or a power-voltage PV curve. In the embodiments of this application, the IV curve is used as an example for description.

Figure 4:
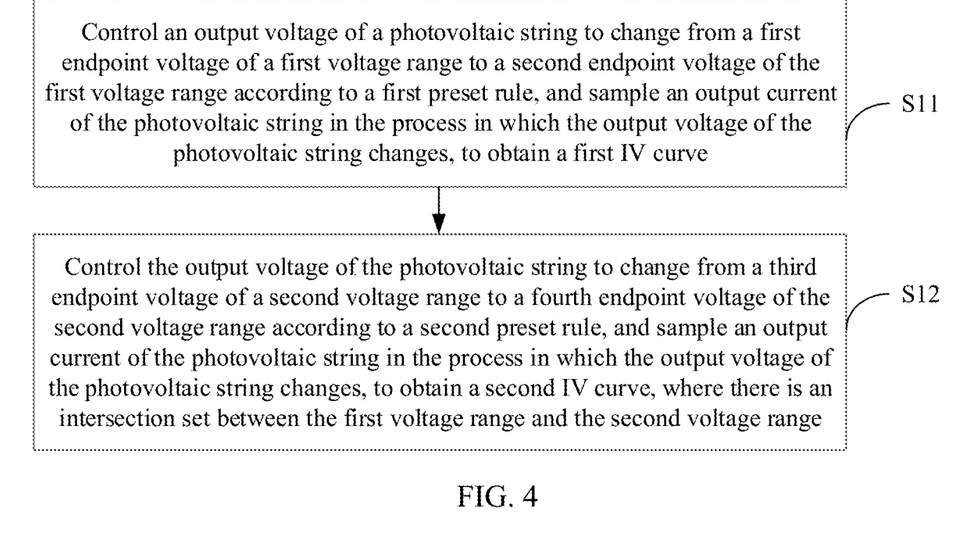
FIG. 4 is a flowchart of an IV curve scanning method for a photovoltaic string according to an embodiment of this application.

FIG. 4 is a flowchart of an IV curve scanning method for a photovoltaic string according to an embodiment of this application. As shown in FIG. 4, the IV curve scanning method for the photovoltaic string includes the following operations.

Operation S11: Control an output voltage of the photovoltaic string to change from a first endpoint voltage of a first voltage range to a second endpoint voltage of the first voltage range according to a first preset rule, and sample an output current of the photovoltaic string in the process in which the output voltage of the photovoltaic string changes, to obtain a first IV curve.

The first voltage range is a voltage scanning range including a maximum output voltage and a minimum output voltage of the photovoltaic string in a process of scanning the first IV curve. For example, the maximum output voltage of the photovoltaic string may be an open-circuit voltage, and a minimum output voltage value may be 0 V.

In an implementation, the first preset rule is at least one of a rule in which a voltage drops by a fixed voltage difference or a rule in which a voltage drops by a changeable voltage difference. In some embodiments, a preset rule in which the converter 100 controls an output voltage of the photovoltaic string 300 to change from an open-circuit voltage to a preset minimum value may be that the output voltage gradually decreases by a fixed voltage difference (for example, 25 V), or gradually decreases according to the rule in which a voltage drops by a changeable voltage difference. The rule in which a voltage drops by a changeable voltage difference specifically means that the voltage drops relatively fast near the open-circuit voltage of the photovoltaic string or the preset minimum value, and drops relatively slow in a middle part. In another implementation, the first preset rule may be another rule that can be used to implement a voltage change. This is not specifically limited herein.

Operation S12: Control the output voltage of the photovoltaic string to change from a third endpoint voltage of a second voltage range to a fourth endpoint voltage of the second voltage range according to a second preset rule, and sample an output current of the photovoltaic string in the process in which the output voltage of the photovoltaic string changes, to obtain a second IV curve, where there is an intersection set between the first voltage range and the second voltage range.

The second voltage range is a voltage scanning range including a maximum output voltage and a minimum output voltage of the photovoltaic string in a process of scanning the second IV curve. For example, the maximum output voltage of the photovoltaic string may be an open-circuit voltage, and a minimum output voltage may be 0 V. The second preset rule is similar to the first preset rule. Details are not described herein again.

The operations of the method shown in FIG. 4 may be specifically implemented by the converter 100 shown in FIG. 3. For example, both operation S11 and operation S12 may be implemented by the DC/DC circuit 10 and the sampling circuit 30. For example, the DC/DC circuit 10 actively adjusts input power corresponding to the photovoltaic string 300, to further control the output voltage of the photovoltaic string 300 to change to a corresponding endpoint voltage.

In the IV curve scanning method for the photovoltaic string disclosed in this embodiment of this application, IV curve scanning is separately performed on the photovoltaic string in the first voltage range and the second voltage range, and there is an intersection set between the first voltage range and the second voltage range, so that the first IV curve and the second IV curve that are obtained include parts corresponding to a same voltage. However, currents corresponding to the same voltage are obtained at different time points, so that it can be determined, by comparing the currents corresponding to the same voltage part, whether the currently obtained IV curve is affected by light, to further determine whether the currently obtained IV curve is valid, thereby improving scanning reliability. In addition, in this method, no test device needs to be additionally added, to effectively reduce a quantity of hardware devices that need to be provided, and reduce curve scanning costs.

Figure 5:
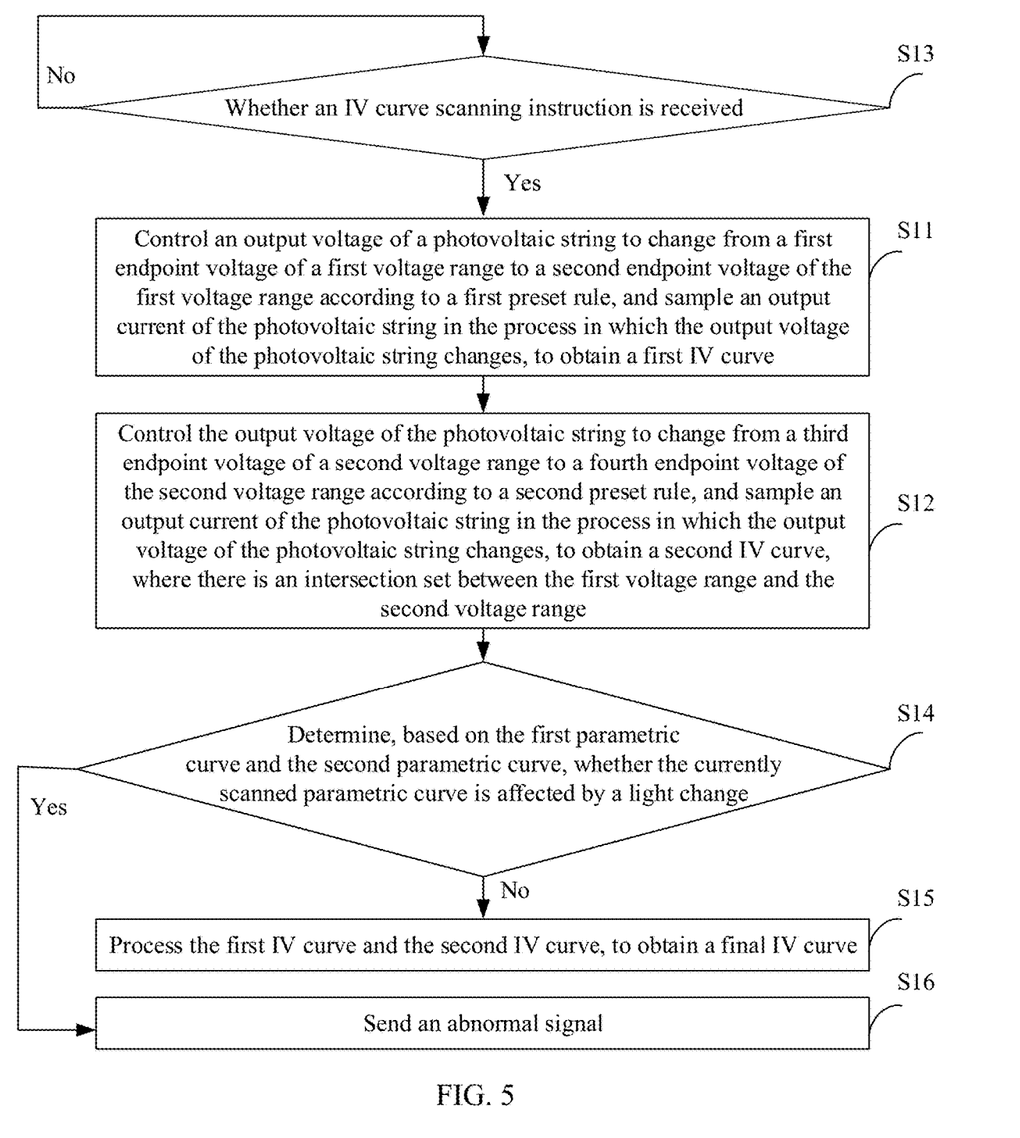
FIG. 5 is a flowchart of an IV curve scanning method for a photovoltaic string according to another embodiment of this application.

FIG. 5 is a flowchart of an IV curve scanning method for a photovoltaic string according to another embodiment of this application. A difference from FIG. 4 is that the IV curve scanning method in this implementation further includes the following operations.

Operation S13: Determine whether an IV curve scanning instruction is received. If the IV curve scanning instruction is received, operation S11 is performed; or if the IV curve scanning instruction is not received, operation S13 continues to be performed.

The converter 100 is initially in a normal on-grid state. Therefore, only when the converter 100 receives an IV curve scanning instruction sent by a host computer, the converter 100 can determine that an IV curve scanning task that needs to be performed. In other words, in this implementation, operation S13 further needs to be performed before operation S11 is performed.

Operation S14: Determine, based on the first IV curve and the second IV curve, whether the currently scanned IV curve is affected by a light change. If the currently scanned IV curve is not affected by the light change, operation S15 is performed; or if the currently scanned IV curve is affected by the light change, operation S16 is performed.

In some embodiments, the first IV curve and the second IV curve may be compared, to determine whether the currently scanned IV curve is affected by the light change. For example, the controller 40 compares the first parametric curve and the second parametric curve, to determine whether light intensity corresponding to the first IV curve and light intensity corresponding to the second IV curve change. In some embodiments, if an absolute value of a difference between current values corresponding to a same voltage point that are on the first IV curve and the second IV curve is less than a preset threshold, the controller 40 determines that the current IV curve is not affected by light, in other words, the currently obtained IV curve is valid.

It should be noted that in an ideal environment, a same output voltage of a photovoltaic string 300 corresponds to a same current if light intensity does not change. However, in an actual use process, there may be a slight error between two sampled currents corresponding to a same voltage due to sampling precision, or although light may slightly change in a process of sampling the two currents, it may be considered that there is no light change. Therefore, provided that an absolute value of a difference between the two sampled currents corresponding to the same voltage falls within an allowable range, it can be determined that the currently obtained IV curve is not affected by the light change. The preset threshold may be determined based on an actual application. This is not limited herein.

Operation S15: Process the first IV curve and the second IV curve, to obtain a final IV curve.

When it is determined that the first IV curve and the second IV curve that are currently obtained are not affected by the light change, it indicates that both the first IV curve and the second IV curve are valid. However, to further improve precision of the obtained curves, the first IV curve and the second IV curve may be comprehensively processed. For example, an average current of currents corresponding to a same voltage point is obtained, and then the final IV curve is obtained and sent to the host computer.

Operation S16: Send an abnormal signal.

When it is determined that the first IV curve and the second IV curve that are currently obtained are affected by the light change, it indicates that the first IV curve and the second IV curve are invalid. Therefore, the abnormal signal is sent to the host computer, to indicate that current scanning fails. Therefore, the host computer may determine, based on feedback, whether to send a parametric curve scanning instruction again.

In some embodiments, the first endpoint voltage is greater than the second endpoint voltage. For example, the first endpoint voltage is an upper limit voltage of the first voltage range, and the second endpoint voltage is a lower limit voltage of the first voltage range. In some embodiments, the third endpoint voltage is less than the fourth endpoint voltage. For example, the third endpoint voltage is a lower limit voltage of the second voltage range, and the fourth endpoint voltage is an upper limit voltage of the second voltage range. In other words, the output voltage of the photovoltaic string 300 is first controlled to change from the upper limit voltage of the first voltage range to the lower limit voltage of the first voltage range according to the first preset rule, to scan the first IV curve; and then the output voltage of the photovoltaic string 300 is controlled to change from the lower limit voltage of the second voltage range to the upper limit voltage of the second voltage range according to the second preset rule, to scan the second IV curve. In this way, a scanning endpoint of the first IV curve is relatively close to a scanning startpoint of the second IV curve. Therefore, an IV curve scanning speed can be increased.

In some embodiments, to present a complete output feature of the photovoltaic string, the upper limit voltage of the first voltage range is set to be less than or equal to the open-circuit voltage Voc of the string and greater than a maximum power point voltage Vmpp of the string. In some embodiments, the upper limit voltage of the first voltage range may be close to and slightly less than the open-circuit voltage of the string. The lower limit voltage of the first voltage range is set to be greater than or equal to zero and less than the maximum power point voltage Vmpp of the string. In some embodiments, the lower limit voltage of the first voltage range may be close to and slightly greater than zero.

Similarly, the upper limit voltage of the second voltage range is set to be less than or equal to the open-circuit voltage Voc of the string and greater than the maximum power point voltage Vmpp of the string. In an actual application, the upper limit voltage of the second voltage range may be close to and slightly less than the open-circuit voltage of the string. The lower limit voltage of the second voltage range is set to be greater than or equal to zero and less than the maximum power point voltage Vmpp of the string. In some embodiments, the lower limit voltage of the second voltage range may be close to and slightly greater than zero.

The upper limit voltage of the second voltage range may be equal to the upper limit voltage of the first voltage range, or may be unequal to the upper limit voltage of the first voltage range. The lower limit voltage of the second voltage range may be equal to the lower limit voltage of the first voltage range, or may be unequal to the lower limit voltage of the first voltage range.

In some embodiments, to improve comparison precision, the upper limit voltage of the first voltage range is equal to the upper limit voltage of the second voltage range, and the lower limit voltage of the first voltage range is equal to the lower limit voltage of the second voltage range. In other words, the first voltage range and the second voltage range completely coincide.

Further, in some embodiments, to facilitate comparison between the first IV curve and the second IV curve and improve comparison efficiency, the first preset rule and the second preset rule each are a rule in which a voltage changes by a fixed voltage difference. In some embodiments, the first preset rule is a rule in which a voltage drops by a fixed voltage difference, and the second preset rule is a rule in which a voltage rises by a fixed voltage difference. For example, 32 sampling points may be selected in each of the first voltage range and the second voltage range. The upper limit voltage of the first voltage range is the open-circuit voltage Voc of the photovoltaic string 300, and the lower limit voltage of the first voltage range is 0 V. Therefore, the 32 sampling points in the first voltage range are respectively U1=Voc, U2=(30/31)×Voc, U3=(29/31)×Voc, . . . , U31=(1/31)×Voc, and U32=0. Similarly, the 32 sampling points in the second voltage range are respectively U1=0, U2=(1/31)×Voc, U3=(2/31)×Voc, . . . , U31=(30/31)×Voc, and U32=Voc. In this case, the sampling points in the first voltage range are exactly the same as the sampling points in the second voltage range, so that a calculation amount is reduced, and a comparison speed is improved.

Figure 6:
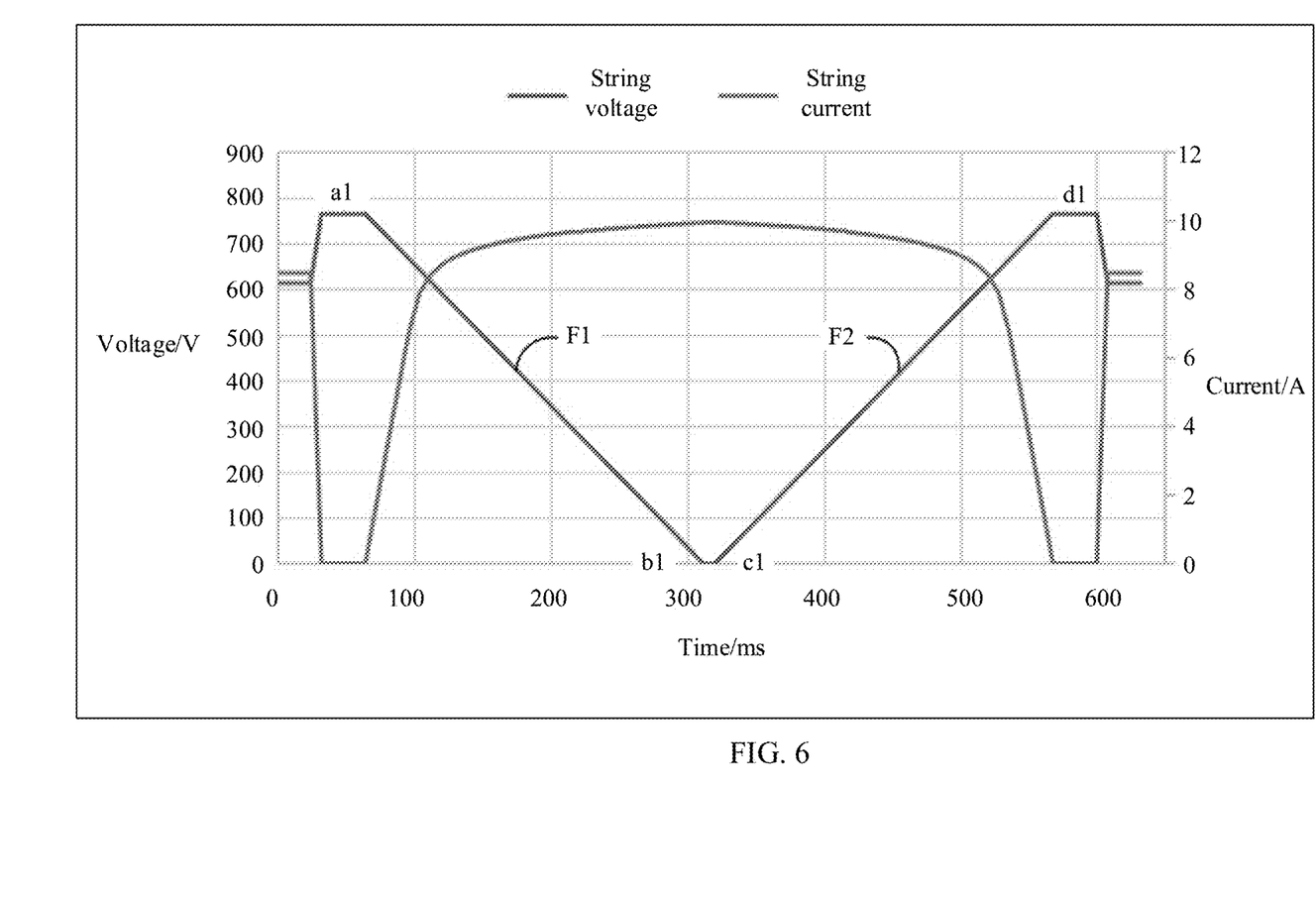
FIG. 6 is a diagram of an IV scanning waveform of a photovoltaic string according to an embodiment of this application.

FIG. 6 is a diagram of an IV scanning waveform of a photovoltaic string according to an embodiment of this application. To further improve comparison efficiency, data at two sampling points is completely the same. As shown in FIG. 6, a time-related waveform F1 in the first voltage range is symmetrical to a time-related waveform F2 in the second voltage range. Herein, a1 is the upper limit voltage of the first voltage range, b1 is the lower limit voltage of the first voltage range, c1 is the lower limit voltage of the second voltage range, and d1 is the upper limit voltage of the second voltage range.

In some embodiments, the first endpoint voltage is less than the second endpoint voltage. For example, the first endpoint voltage is the lower limit voltage of the first voltage range, and the second endpoint voltage is the upper limit voltage of the first voltage range. In some embodiments, the third endpoint voltage is greater than the fourth endpoint voltage. For example, the third endpoint voltage is the upper limit voltage of the second voltage range, and the fourth endpoint voltage is the lower limit voltage of the second voltage range. In other words, the output voltage of the photovoltaic string 300 is first controlled to change from the lower limit voltage of the first voltage range to the upper limit voltage of the first voltage range according to the first preset rule, to scan the first IV curve; and then the output voltage of the photovoltaic string 300 is controlled to change from the upper limit voltage of the second voltage range to the lower limit voltage of the second voltage range according to the second preset rule, to scan the second IV curve. Other details are the same as or similar to those in the foregoing embodiments, and are not described herein again.

Figure 7:
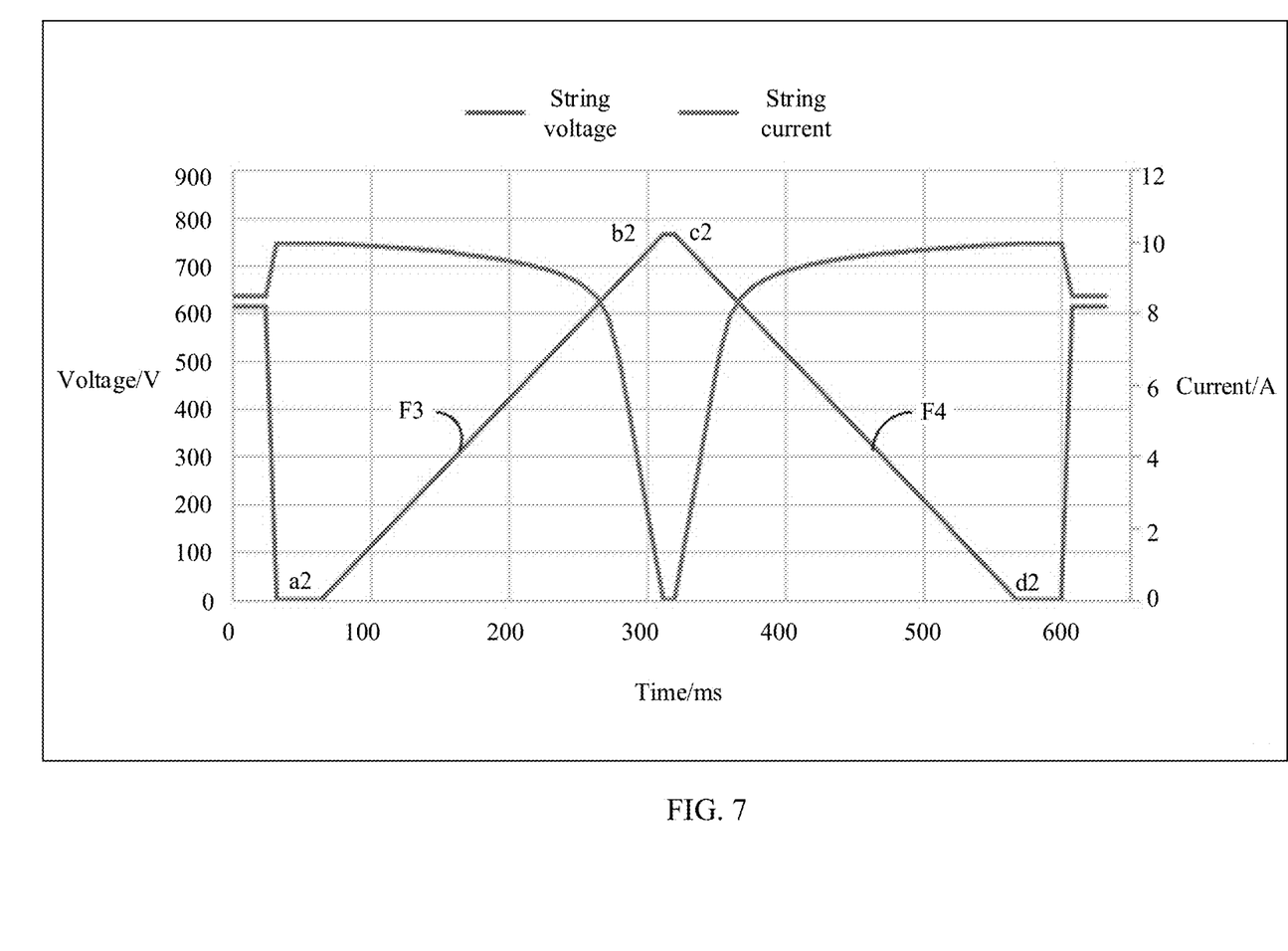
FIG. 7 is a diagram of an IV scanning waveform of a photovoltaic string according to another embodiment of this application.

An IV scanning waveform in this implementation of this application is shown in FIG. 7. A time-related waveform F3 in the first voltage range is symmetrical to a time-related waveform F4 in the second voltage range. Herein, a2 is the lower limit voltage of the first voltage range, b2 is the upper limit voltage of the first voltage range, c2 is the upper limit voltage of the second voltage range, and d2 is the lower limit voltage of the second voltage range.

Figure 8:
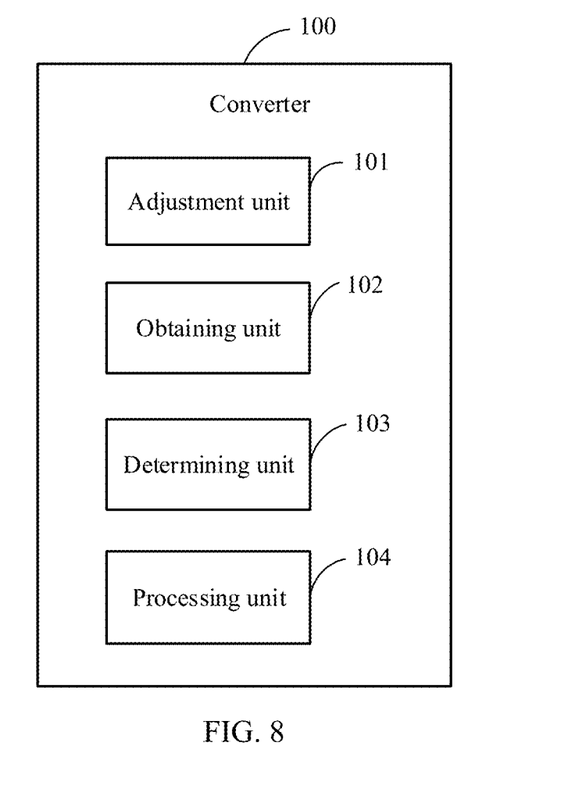
FIG. 8 is a diagram of a function module of a converter according to an embodiment of this application.

FIG. 8 is a diagram of a function module of a converter according to an embodiment of this application. In some embodiments, a converter 100 is presented in a form of a function unit. The "unit" herein may be an application-specific integrated circuit, a controller and a memory that execute one or more software or firmware programs, an integrated logic circuit, and/or another device that can provide the foregoing function. In some embodiments, a person skilled in the art may figure out that the converter 100 may be in a form shown in FIG. 8. In some embodiments, as shown in FIG. 8, the converter 100 includes an adjustment unit 101, an obtaining unit 102, a determining unit 103, and a processing unit 104.

The adjustment unit 101 is configured to control an output voltage of the photovoltaic string to change from a first endpoint voltage of a first voltage range to a second endpoint voltage of the first voltage range according to a first preset rule. The obtaining unit 102 is configured to obtain a current of the photovoltaic string in the process in which the output voltage change of the photovoltaic string changes, to scan a first IV curve.

The adjustment unit 101 is further configured to control the output voltage of the photovoltaic string to change from a third endpoint voltage of a second voltage range to a fourth endpoint voltage of the second voltage range according to a second preset rule. The obtaining unit 102 is further configured to obtain a current of the photovoltaic string in the process in which the output voltage of the photovoltaic string changes, to scan the second IV curve.

The determining unit 103 is configured to determine, based on the first IV curve and the second IV curve, whether the currently scanned parametric curve is affected by a light change. In some embodiments, the determining unit 103 is configured to: when an absolute value of a difference between the corresponding parameter values of a same voltage point that are on the first IV curve and the second IV curve is less than a preset threshold, determine that the currently scanned IV curve is not affected by the light change.

The processing unit 104 is configured to process the first IV curve and the second IV curve when it is determined that the currently scanned curve is not affected by the light change, to obtain a final IV curve. The processing unit 104 is further configured to send an abnormal signal when it is determined that the currently scanned curve is affected by the light change.

In some embodiments, for example, the adjustment unit 101 may be implemented by a DC/DC circuit 20. The obtaining unit 102 may be implemented by a sampling circuit 20, and the determining unit 103 and the processing unit 104 may be implemented by a controller 40.

An embodiment of this application further provides a computer storage medium, configured to store computer software instructions used by the converter shown in FIG. 8. The computer software instructions include a program designed for performing the foregoing method embodiment.

The stored program is executed, to implement IV curve scanning on a photovoltaic string, and further determine whether an IV curve is affected by the light change.

It may be clearly understood by a person skilled in the art that, for the purpose of convenient and brief description, for a detailed working process of the foregoing apparatuses and units, reference may be to a corresponding process in the foregoing method embodiments, and details are not described herein again.

In some embodiments, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

The embodiments in this specification are all described in a progressive manner, for same or similar parts in the embodiments, reference may be made to these embodiments, and each embodiment focuses on a difference from other embodiments. The method disclosed in the embodiments corresponds to the apparatus disclosed in the embodiments, and therefore is described relatively briefly. For related parts, reference may be made to descriptions of the apparatus.

It should be noted that, for brief description, the foregoing method embodiments are represented as a series of actions. However, a person skilled in the art should appreciate that this application is not limited to the described order of the actions, because according to this application, some operations may be performed in other orders or simultaneously.

A sequence of the operations of the method in the embodiments of this application may be adjusted, combined, or removed based on an actual requirement.

Implementations of this application may be randomly combined, to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In summary, the foregoing descriptions are only embodiments of the technical solutions of the present disclosure, but are not intended to limit the protection scope of the present disclosure. Any modification, equivalent replacement, or improvement made based on the disclosure of the present disclosure shall fall within the protection scope of the present disclosure.

What is claimed is:

1. A parametric curve scanning method for a photovoltaic string, applied to a photovoltaic power generation system, wherein the photovoltaic power generation system comprises a converter and at least one photovoltaic string connected to the converter, and the scanning method comprises:
    controlling an output voltage of the photovoltaic string to change from a first endpoint voltage of a first voltage range to a second endpoint voltage of the first voltage range according to a first preset rule;
    obtaining a current parameter or a power parameter of the photovoltaic string in the process in which the output voltage of the photovoltaic string changes, to scan a first parametric curve;
    controlling the output voltage of the photovoltaic string to change from a third endpoint voltage of a second voltage range to a fourth endpoint voltage of the second voltage range according to a second preset rule; and
    obtaining a current parameter or a power parameter of the photovoltaic string in the process in which the output voltage of the photovoltaic string changes, to scan a second parametric curve.

2. The scanning method of claim 1, wherein the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage.

3. The scanning method of claim 2, wherein at least one of the first endpoint voltage is equal to the fourth endpoint voltage, or the second endpoint voltage is equal to the third endpoint voltage.

4. The scanning method of claim 3, wherein a time-related waveform in the first voltage range is symmetrical to a time-related waveform in the second voltage range.

5. The scanning method of claim 1, wherein the first preset rule is a rule in which a voltage drops by a fixed voltage difference and the second preset rule is a rule in which a voltage rises by a fixed voltage difference; or the first preset rule is a rule in which a voltage rises by a fixed voltage difference and the second preset rule is a rule in which a voltage drops by a fixed voltage difference.

6. The scanning method of claim 1, wherein the scanning method further comprises:
    determining, based on the first parametric curve and the second parametric curve, whether a currently scanned parametric curve is affected by a light change.

7. The scanning method of claim 6, wherein the determining, based on the first parametric curve and the second parametric curve, whether the currently scanned parametric curve is affected by a light change comprises:
    comparing the first parametric curve and the second parametric curve, to determine whether light intensity corresponding to the first parametric curve and light intensity corresponding to the second parametric curve change.

8. The scanning method of claim 6, wherein the scanning method further comprises:
    if an absolute value of a difference between the corresponding parameter values of a same voltage point that are on the first parametric curve and the second parametric curve is less than a preset threshold, determining that the currently scanned parametric curve is not affected by the light change.

9. The scanning method of claim 1, wherein there is an intersection set between the first voltage range and the second voltage range.

10. A converter, comprising:
a DC/DC circuit, configured to control an output voltage of a photovoltaic string to change from a first endpoint voltage of a first voltage range to a second endpoint voltage of the first voltage range according to a first preset rule; and
a sampling circuit, configured to obtain at least one of a current parameter or a power parameter of the photovoltaic string in the process in which the output voltage of the photovoltaic string changes, to scan a first parametric curve, wherein
the DC/DC circuit is further configured to control the output voltage of the photovoltaic string to change from a third endpoint voltage of a second voltage range to a fourth endpoint voltage of the second voltage range according to a second preset rule, wherein
the sampling circuit is further configured to obtain at least one of a current parameter or a power parameter of the photovoltaic string in the process in which the output voltage of the photovoltaic string changes, to scan a second parametric curve.

11. The converter of claim 10, wherein the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage.

12. The converter of claim 11, wherein the first endpoint voltage is equal to the fourth endpoint voltage, and/or the second endpoint voltage is equal to the third endpoint voltage.

13. The converter of claim 12, wherein a time-related waveform in the first voltage range is symmetrical to a time-related waveform in the second voltage range.

14. The converter of claim 10, wherein the first preset rule is a rule in which a voltage drops by a fixed voltage difference and the second preset rule is a rule in which a voltage rises by a fixed voltage difference; or the first preset rule is a rule in which a voltage rises by a fixed voltage difference and the second preset rule is a rule in which a voltage drops by a fixed voltage difference.

15. The converter of claim 10, wherein the converter further comprises a controller, the controller is separately electrically connected to the sampling circuit and the DC/DC circuit, and the controller is configured to determine, based on the first parametric curve and the second parametric curve, whether a currently scanned parametric curve is affected by a light change.

16. The converter of claim 15, wherein the controller is configured to compare the first parametric curve and the second parametric curve, to determine whether light intensity corresponding to the first parametric curve and light intensity corresponding to the second parametric curve change.

17. The converter of claim 15, wherein the controller is configured to: when an absolute value of a difference between the corresponding parameter values of a same voltage point that are on the first parametric curve and the second parametric curve is less than a preset threshold, determine that the currently scanned parametric curve is not affected by the light change.

18. The converter of claim 10, wherein there is an intersection set between the first voltage range and the second voltage range.

19. A photovoltaic power generation system, comprising:
a power grid;
at least one photovoltaic string;
a DC/DC circuit, configured to control an output voltage of the at least one photovoltaic string to change from a first endpoint voltage of a first voltage range to a second endpoint voltage of the first voltage range according to a first preset rule; and
a sampling circuit, configured to obtain at least one of a current parameter or a power parameter of the at least one photovoltaic string in the process in which the output voltage of the at least one photovoltaic string changes, to scan a first parametric curve, wherein
the DC/DC circuit is further configured to control the output voltage of the at least one photovoltaic string to change from a third endpoint voltage of a second voltage range to a fourth endpoint voltage of the second voltage range according to a second preset rule, wherein
the sampling circuit is further configured to obtain at least one of a current parameter or a power parameter of the at least one photovoltaic string in the process in which the output voltage of the at least one photovoltaic string changes, to scan a second parametric curve, wherein
the photovoltaic power generation system further comprises the converter of claim 10, an input end of the converter is connected to the at least one photovoltaic string, and an output end of the converter is connected to the power grid.

20. The photovoltaic power generation system of claim 19, wherein the first endpoint voltage is greater than the second endpoint voltage and the third endpoint voltage is less than the fourth endpoint voltage; or the first endpoint voltage is less than the second endpoint voltage and the third endpoint voltage is greater than the fourth endpoint voltage.

* * * * *